3,040,042
BENZOTHIADIAZINES
Harry Louis Yale and Jack Bernstein, New Brunswick, N.J., assignors to Olin Mathieson Chemical Corporation, New York, N.Y., a corporation of Virginia
No Drawing. Filed Nov. 25, 1957, Ser. No. 698,377
14 Claims. (Cl. 260—243)

This invention relates to new benzothiadiazine derivatives, and more particularly to new trifluoromethyl-benzothiadiazinesulfonamide derivatives, one tautomeric form of which may be represented by the formula

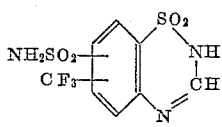

as well as alkali metal salts thereof.

The new benzothiadiazines of this invention are physiologically active compounds which possess both diuretic and anti-hypertensive activities. Thus, these compounds are administrable parenterally and (preferably) orally in the treatment of congestive heart failure, being uniquely suitable for this and other conditions where both the diuretic and anti-hypertensive activities are desirable.

The compounds of this invention are prepared by the process of this invention which essentially comprises: (a) reacting an aminobenzotrifluoride with chlorosulfonic acid in the presence of an alkali metal chloride (e.g. sodium chloride) to yield amino-$\alpha,\alpha,\alpha$-trifluorotoluenedisulfonyl chloride derivatives, which are new intermediates of this invention, the reaction preferably being conducted at an elevated temperature employing at least two equivalents of chlorosulfonic acid; (b) treating the resulting amino-$\alpha,\alpha,\alpha$-trifluorotoluenedisulfonyl chloride derivatives with aqueous ammonia to yield the corresponding amino-$\alpha,\alpha,\alpha$-trifluorotoluenedisulfonamide derivatives, which are also new intermediates of this invention; and (c) cyclizing the amino-$\alpha,\alpha,\alpha$-trifluorotoluenedisulfonamide derivatives by treatment with formic acid at an elevated temperature to yield the desired final products in the free acid form. These free acids can then, if desired, be neutralized by treatment with alcoholic alkali metal hydroxide (e.g., potassium hydroxide and sodium hydroxide), whereby the alkali metal salts are formed.

Among the suitable starting materials for the process of this invention may be mentioned 2-aminobenzotrifluoride, 3-aminobenzotrifluoride, and 4-aminobenzotrifluoride, which yield, respectively, the final products: 5-(trifluoromethyl)-1,2,4-benzothiadiazine-7-sulfonamide 1,1-dioxide; 6-(trifluoromethyl)-1,2,4-benzothiadiazine-7-sulfonamide 1,1-dioxide; and 7-(trifluoromethyl)-1,2,4-benzothiadiazine-5-sulfonamide 1,1-dioxide.

The following examples illustrate the invention (all temperatures being in centigrade):

EXAMPLE 1

6-(Trifluoromethyl)-1,2,4-Benzothiadiazine-7-Sulfonamide 1,1-Dioxide (a) *Preparation of 5-amino-$\alpha,\alpha,\alpha$-trifluoro-2,4-toluenesulfonamide.*—To 100 ml. of 99% chlorosulfonic acid at room temperature is added dropwise 20 g. of m-aminobenzotrifluoride. Subsequently, this mixture is gradually treated with a total of 90 g. of sodium chloride during a period of one hour. The viscous mass resulting is then heated by means of an oil bath to 180° and kept at this temperature for two hours. During this time the reaction mixture becomes solid and stirring is discontinued. The mixture is then cooled by an ice bath and when cool, the reaction mixture is rapidly diluted with 500 ml. of ice cold water and stirred until a fine yellow colored suspension is obtained. The solid is filtered, dried and stirred into 600 ml. of ether. The yellow ether solution is decanted from any insoluble material, washed with water, dried over magnesium sulfate and concentrated from the steam bath to a volume of about 50 ml. This ether solution contains 5-amino-$\alpha,\alpha,\alpha$-trifluoro-2,4-toluenedisulfonyl chloride, which can be isolated as a crystalline solid.

The ether solution containing the 5-amino-$\alpha,\alpha,\alpha$-trifluoro-2,4-toluenedisulfonyl chloride is cooled in an ice bath and treated slowly with 50 ml. of concentrated aqueous ammonia. A vigorous reaction occurs. Finally, the mixture is heated one hour on the steam bath and cooled to give about 8 g. of 5-amino-$\alpha,\alpha,\alpha$-trifluoro-2,4-toluenedisulfonamide, M.P. about 236–238° after recrystallization from water.

(b) *Preparation of 6-(trifluoromethyl)-1,2,4-benzothiadiazine-7-sulfonamide 1,1-dioxide.*—A mixture of 8 g. of 5-amino-$\alpha,\alpha,\alpha$-trifluoro-2,4-toluenedisulfonamide and 200 ml. of 98–100% formic acid is refluxed for two hours. 100 ml. of formic acid is distilled and the residual solution is diluted with water. The product separates and is collected on a filter. Recrystallization from water gives 6-(trifluoromethyl)-1,2,4-benzothiadiazine-7-sulfonamide 1,1-dioxide, M.P. about 305–306°.

EXAMPLE 2

*Potassium Salt of 6-(Trifluoromethyl)-1,2,4-Benzothiadiazine-7-Sulfonamide 1,1-Dioxide*

To a solution of 6.6 g. of 85% potassium hydroxide in 100 ml. of 95% ethanol is added gradually with shaking 1.65 g. of 6-(trifluoromethyl)-1,2,4-benzothiadiazine-7-sulfonamide 1,1-dioxide. The solid dissolves. The resulting alcoholic solution is concentrated in vacuo to yield the dipotassium salt of 6-(trifluoromethyl)-1,2,4-benzothiadiazine-7-sulfonamide 1,1-dioxide as a free flowing granular powder.

Similarly, using the equivalent quantity of sodium hydroxide instead of potassium hydroxide, the disodium salt is obtained.

EXAMPLE 3

7-(Trifluoromethyl)-1,2,4-Benzothiadiazine-5-Sulfonamide 1,1-Dioxide (a) *Preparation of 4-amino-$\alpha,\alpha,\alpha$-trifluoro-3,5-toluenesulfonamide.*—To 100 ml. of 99% chlorosulfonic acid at room temperature is added slowly with stirring 20 g. of 4-aminobenzotrifluoride. Heat is evolved and a clear yellow solution is formed. To the solution is added during one hour a total of 90 g. of sodium chloride. The resulting mass is then heated by means of an oil bath to 180° (external temperature) and the temperature maintained at 180–185° for three hours. The reaction mixture is then cooled and treated rapidly with a total of about 500 ml. of ice cold water. The hard granular mass disintegrates and yields a granular yellow-tan solid. This solid is filtered and then stirred up with about 600 ml. of ether. A clear yellow solution is formed. This ether solution is separated from any water, dried and concentrated to about 50 ml. The resulting solution, which contains 4-amino-$\alpha,\alpha,\alpha$-trifluoro-3,5-toluenedisulfonyl chloride, is cooled in ice and treated slowly with 50 ml. of concentrated aqueous ammonia. The mixture, which consists of two phases, is gradually warmed on the steam bath to about 90° and kept there for one hour. The product, 4-amino-$\alpha,\alpha,\alpha$-trifluoro-3,5-toluenedisulfonamide separates and is filtered. The yield is about 12 g.

(b) *Preparation of 7-(trifluoromethyl)-1,2,4-benzothiadiazine-5-sulfonamide 1,1-dioxide.*—12 g. of 4-amino-$\alpha,\alpha,\alpha$-trifluoro-3,5-toluenedisulfonamide and 300 ml. of 98–100% formic acid are refluxed for two hours and the mixture concentrated to dryness in vacuo. The residual solid is recrystallized from boiling water to give 7-(trifluoromethyl)-1,2,4-benzothiadiazine-5-sulfonamide 1,1-dioxide as colorless needles, M.P. about 300°.

EXAMPLE 4

*5-(Trifluoromethyl)-1,2,4-Benzothiadiazine-7-Sulfonamide 1,1-Dioxide*

By substituting 2-aminobenzotrifluoride for the 4-aminobenzotrifluoride in the procedure of step *a* in Example 3 and then following the procedures of steps *a* and *b* of the example, there is obtained first 2-amino-α,α,α-trifluoro-3,5-toluenedisulfonyl chloride; then, 2-amino-α,α,α-trifluoro-3,5-toluenedisulfonamide; and finally, 5-(trifluoromethyl) - 1,2,4-benzothiadiazine-7-sulfonamide 1,1-dioxide, which forms as colorless needles, M.P. above 300°, when recrystallized from boiling water.

The invention may be variously otherwise embodied within the scope of the appended claims.

What is claimed is:

1. A compound selected from the group consisting of benzothiadiazines of the formula

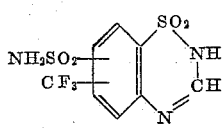

and alkali metal salts thereof.

2. 6 - (trifluoromethyl) - 1,2,4 - benzothiadiazine - 7 - sulfonamide 1,1-dioxide.

3. 5 - (trifluoromethyl) - 1,2,4 - benzothiadiazine - 7 - sulfonamide 1,1-dioxide.

4. 7 - (trifluoromethyl) - 1,2,4 - benzothiadiazine - 5 - sulfonamide 1,1-dioxide.

5. A compound of the formula

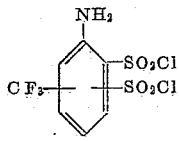

6. A compound of the formula

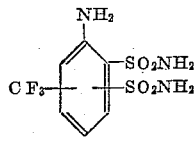

7. A process for preparing a compound of claim 1 which comprises interacting a compound of the formula

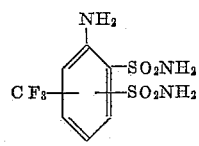

with formic acid at an elevated temperature.

8. The process of claim 7 wherein 5-amino-α,α,α-trifluoro-2-toluenedisulfonamide is the reactant.

9. The process of claim 1 wherein 4-amino-α,α,α-trifluoro-3,5-toluenedisulfonamide is the reactant.

10. The process of claim 7 wherein 2-amino-α,α,α-trifluoro-3,5-toluenedisulfonamide is the reactant.

11. A process for preparing a compound of claim 6 which comprises interacting a compound of the formula

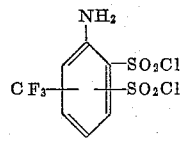

with aqueous ammonia.

12. A process for preparing a compound of claim 5 which comprises interacting a compound selected from the group consisting of 2-aminobenzotrifluoride, 3-aminobenzotrifluoride, and 4-aminobenzotrifluoride with at least two equivalents of chlorosulfonic acid in the presence of an alkali metal chloride.

13. 5-trifluoromethyl-2,4-disulfamyl-aniline.

14. 5 - amino - α,α,α - trifluoro - 2,4 - toluenedisulfonyl chloride.

References Cited in the file of this patent

UNITED STATES PATENTS 2,809,194   Novello ---------------- Oct. 8, 1957

OTHER REFERENCES

Craig et al.: J. Org. Chem., vol. 22, pages 709–711, June 1957.

UNITED STATES PATENT OFFICE
CERTIFICATE OF CORRECTION

Patent No. 3,040,042            June 19, 1962

Harry Louis Yale et al.

It is hereby certified that error appears in the above numbered patent requiring correction and that the said Letters Patent should read as corrected below.

Column 4, line 11, for "-2-" read -- -2,4- --.

Signed and sealed this 23rd day of October 1962.

(SEAL)
Attest:

ERNEST W. SWIDER
Attesting Officer

DAVID L. LADD
Commissioner of Patents